United States Patent
Koledin

[19]

[11] Patent Number: 5,857,751
[45] Date of Patent: Jan. 12, 1999

[54] AIRBAG BARRIER CAGE

[76] Inventor: Emil M. Koledin, 4935 Lakeview Dr., Hermitage, Pa. 16148

[21] Appl. No.: 780,257

[22] Filed: Jan. 8, 1997

[51] Int. Cl.$^6$ .................................................. B60R 21/00
[52] U.S. Cl. ........................................ 297/487; 297/216.1
[58] Field of Search .................................... 297/487, 488, 297/464, 216.1, 250.1, 256.15; 280/756, 748, 750, 751

[56] References Cited

U.S. PATENT DOCUMENTS

| | | | |
|---|---|---|---|
| 3,169,781 | 2/1965 | Abruzzino | 297/487 X |
| 3,722,951 | 3/1973 | Ezquerra | 297/487 X |
| 3,836,168 | 9/1974 | Nonaka et al. . | |
| 3,899,042 | 8/1975 | Bonar . | |
| 4,509,798 | 4/1985 | Strothers . | |
| 4,790,593 | 12/1988 | Davalos et al. . | |
| 4,887,842 | 12/1989 | Sato . | |
| 5,310,214 | 5/1994 | Cuevas . | |
| 5,380,038 | 1/1995 | Hawthorn et al. . | |
| 5,492,361 | 2/1996 | Kim . | |
| 5,499,844 | 3/1996 | Dirck | 297/487 X |
| 5,529,341 | 6/1996 | Hartigan | 297/487 X |
| 5,556,162 | 9/1996 | Raffini . | |
| 5,662,379 | 9/1997 | Zimelman . | |

FOREIGN PATENT DOCUMENTS

| | | | |
|---|---|---|---|
| 2429457 | 1/1976 | Germany | 297/487 |
| 2607802 | 9/1977 | Germany | 297/487 |

Primary Examiner—Milton Nelson, Jr.
Attorney, Agent, or Firm—Thorp Reed & Armstrong

[57] ABSTRACT

An airbag barrier positioned in the front seat of a vehicle for shielding a child passenger from impact from an inflating airbag. The first embodiment is directed to protection of a child secured in the front seat by a seat belt and comprises two barrier members having a top portion, a middle portion, and a downwardly extending lower portion. The top portion and the bottom portion engage the seat. The second embodiment is directed to a child seated in a front facing child car seat and comprises barrier members having a top portion connected to the top of the child car seat, a vertical middle portion and a lower portion connected to the bottom of the child car seat. The third embodiment is directed to a child seated in a rearwardly facing car seat and comprises barrier members attached on either side of the child car seat and extending outwardly to be supported against the seat of the vehicle.

13 Claims, 6 Drawing Sheets

AIRBAG BARRIER CAGE

FIELD OF THE INVENTION

This invention relates to an easy-to-use and reliable device for shielding a child or small passenger from direct or indirect impact caused by activation of an automotive airbag restraint system.

BACKGROUND OF THE INVENTION

Seat belts on both the driver and passenger sides have been installed in vehicles for many years in an attempt to reduce deaths and serious injuries resulting from collisions. More recently, airbag restraints have been installed in vehicles to provide an additional measure of safety. The typical airbag restraint is positioned in the steering wheel well to protect the driver and in a recess in the vehicle dashboard to protect the passenger. More recently, side airbags have been employed in driver and passenger doors to guard the occupants from side collisions.

The inflatable airbag restraint houses an inflator and an inflatable occupant restraint cushion which is normally stored in a folded condition. The steering wheel well or the vehicle dashboard includes an opening which is aligned with the stored airbag restraint cushion. Upon the vehicle experiencing a predetermined rate of deceleration, an inflator is actuated to force high pressure gas into the cushion for deployment through the opening in front of the driver or the passenger.

In order to safeguard adult passengers and to provide sufficient inflation upon rapid vehicular deceleration, high pressure gas propels the airbag out of the steering wheel well or the dashboard at speeds of up to approximately 200 miles per hour. Although high speed inflation is necessary to guard against driver or passenger impact with the steering wheel, dashboard, windshield or door, the force of the nearly instantly pressurized airbag, upon deployment, can result in a fatal blow to a vehicle occupant if the airbag impacts the occupant with undue force or at an undesirable angle.

Of particular concern with respect to impact from inflating airbags are small children riding in the front seat of cars. In order to safeguard a standard size adult passenger, the airbag restraint system is designed to propel the cushion from its stored position at a relatively low angle so that the cushion is properly positioned under the passenger in order to absorb the bodily impact. Due to the relatively low position of a child's head while seated, a small child facing forward in the front seat, either secured by a seat belt or by a child car seat, may suffer severe head and neck injuries caused by impact from the highly pressurized inflating airbag as it expands outwardly at this relatively low angle of trajectory. Additionally, a small child placed in a rearwardly facing child car seat may be forced head first into the backrest of the front seat of an automobile by any force, including an impact by the inflating airbag, acting against the rear of the child car seat.

Thus, while such airbag restraints fully meet the industry standards to protect most adult users, a simple and inexpensive device is needed to protect a child in the front seat of a vehicle in the event of rapid deceleration, by minimizing the potential direct or indirect facial impact of a highly pressurized inflating airbag.

SUMMARY OF THE INVENTION

The present invention comprises an airbag barrier for shielding a child or small passenger in a vehicle. Due to the highly pressurized gas inflation means housed within the storage compartment which inflates the airbag, a danger of serious head or neck injury exists during activation of a vehicular airbag restraint system if a child or small passenger is positioned in the trajectory of the inflating airbag during vehicular impact. The present invention provides a shield for small passengers riding in the front seat of a vehicle to eliminate this danger.

A first embodiment of the present invention is directed to use in association with a rear or front facing child car seat, a booster seat or a seat belt and shoulder harness, and comprises at least two barrier members having a top, middle and lower portion. The upwardly extending middle portion is positioned between the dashboard and the seat of a vehicle. A top portion extends from an upper end of the middle portion and bends to extend over the head of a seated passenger. The barrier members are supported against a back of the seat by a support means connected to the top portion. A lower portion extends downwardly from the middle portion and includes an attachment means to secure the airbag barrier inside the vehicle.

A second embodiment of the present invention is directed to use with a child car seat or a booster seat and comprises at least two barrier members having a top portion connected to the top of a child car seat and positioned above the head of the seated child. The top portion bends downwardly to form a middle portion outwardly positioned from the child car seat. The middle portion continues downwardly and forms a lower portion which bends inwardly and is connected to the bottom of the child car seat.

A third embodiment of the present invention is directed to a support brace for use with a rearwardly facing child car seat or a booster seat and comprises at least two barrier members attached on either side of the child car seat. The barrier members extend outwardly from the child car seat toward the seat of a vehicle. A support means connects the barrier members to each other and is positioned for supporting the barrier members against the seat of a vehicle.

Other details and advantages of the present invention will become apparent from the following detailed description of the presently preferred embodiments of practicing the invention.

BRIEF DESCRIPTION OF THE DRAWINGS

In the accompanying drawings, preferred embodiments of the invention and preferred methods of practicing the invention are illustrated in which.

DETAILED DESCRIPTION OF THE PREFERRED EMBODIMENT

The present invention is described with respect to the preferred physical embodiments constructed in accordance herewith. It will be apparent to those of ordinary skill in the art that various modifications and improvements may be made without departing from the scope and spirit of the invention. Accordingly, the invention is not limited by the specific embodiments illustrated and described, or objects or advantages thereof, but only by the scope of the appended claims, including all equivalents thereof.

It is contemplated that the present invention will be used in association with a conventional seat belt system which acts as the means whereby the passenger is restrained within the confines of the seating area inside the vehicle. No particular type of front car seat design is necessary, as the present invention may accommodate any conventional front car seat. In addition, although reference is made to an automobile, the present invention works equally well with any vehicle employing an airbag restraint system. Finally, although reference is made to children, the present invention performs equally well with passengers short in stature, or those who tend to slouch in the front seat, for example, while sleeping.

Figure 1:
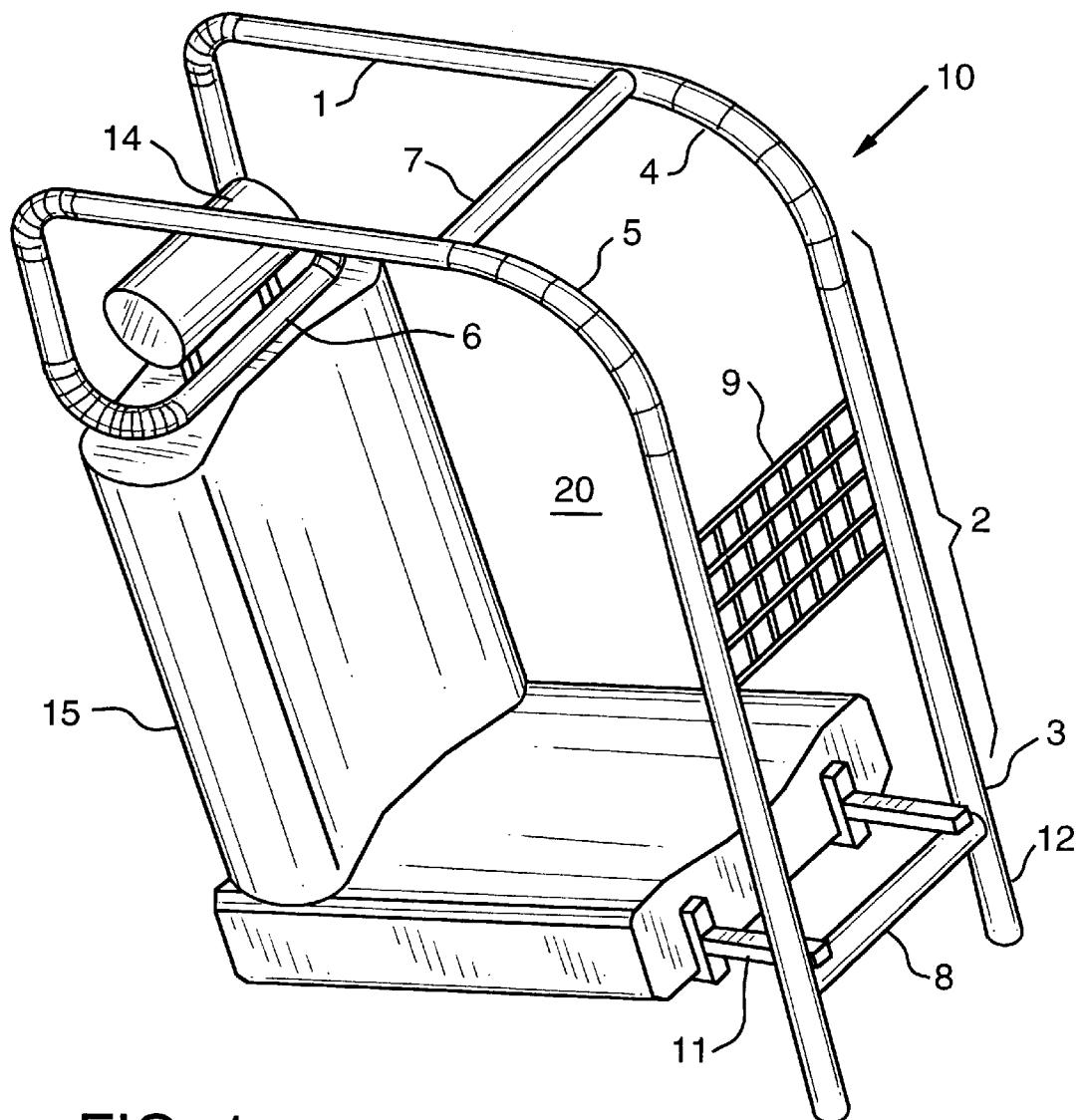
FIG. 1 is an isometric view of an airbag barrier cage of the present invention.
Figure 2:
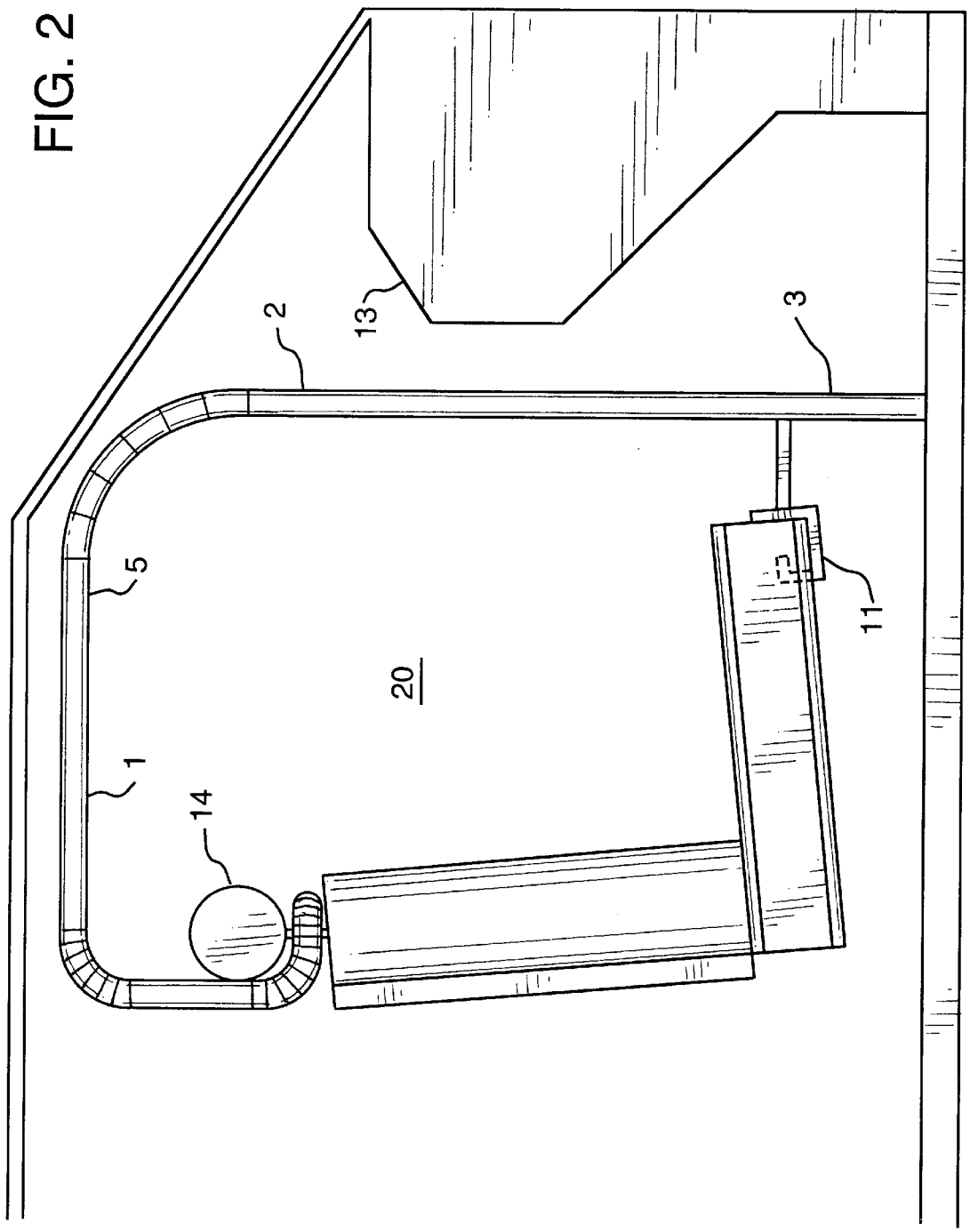
FIG. 2 is a side view of the airbag barrier cage illustrated FIG. 1.

As illustrated in FIGS. 1 and 2 of the drawings, a preferred embodiment of the present invention includes an airbag barrier 10 secured to the front passenger seat 15 of a vehicle to protect the passenger against injury from impact with an inflating airbag restraint system. It is contemplated that the first embodiment of present invention work in association with a front or rearwardly facing child car seat, a booster seat or a seat belt and shoulder harness.

The airbag barrier 10 of the present invention includes preferably two substantially parallel protective barrier members 4 and 5 comprising a top portion, generally, 1, a middle barrier portion, generally, 2 and a lower portion, generally, 3. The barrier members 4 and 5 are preferably barrier bars. The top, middle and lower portions 1, 2, 3, respectively, may be separate members which are connected together, for example by welding, or may be one continuous member which are shaped into three segments, for example by bending or blow molding. The distance between the barrier members 4 and 5 may vary, but is preferably spaced closely enough together so as not to allow an inflating airbag to significantly penetrate the interior space 20 wherein the occupant sits.

Preferably, brace members 7 and 8 interconnect barrier members 4 and 5 in order to provide additional strength to the airbag barrier 10, while connecting portion 6 stabilizes the airbag barrier 10 as described below.

It should be noted that although two barrier members 4 and 5 are shown, any number of barrier members may be used. The inclusion of additional barrier members, however, may result in reduced visibility to the driver. The barrier members 4 and 5 may be constructed of any resilient material suitable for withstanding the impact of an inflating airbag, such as a metal, including but not limited to, steel or aluminum, or any resilient plastic, including, but not limited to, fiberglass, graphite, or other fiber reinforced resins. Additionally, the barrier members 4 and 5 may be any diameter sufficient to buffer the impact of an inflating airbag. Where steel is the selected material for construction, the barrier members 4 and 5 are preferably about 1 inch in diameter. Although any thickness of padding (not shown) may be used, preferably heavy padding of preferably 0.5 to 1.0 inches thick surrounds each of the barrier members 4 and 5 for added protection in the event of a vehicular impact.

The top portion 1 of the airbag barrier 10 extends over the passenger and engages the back of the seat 15 of the vehicle. The top portion 1 may engage the seat by resting in front of, being supported by, or being connected to the back of the seat 15. The top portion 1 of the airbag barrier 10 preferably extends horizontally over the headrest 14 of the front passenger seat 15, then bends down and around the front of the headrest 14 as shown in FIGS. 1 and 2. In this way, the connecting portion 6 rests in front of the headrest 14 and stabilizes the airbag barrier 10 in the event of impact due to inflation of the airbag against the middle barrier portion 2 of the airbag barrier 10.

As best shown in FIG. 2, the barrier members 4 and 5 extend from the, preferably, substantially horizontal top portion 1 and bend to form, preferably, the substantially vertical middle portion 2. The middle portion 2 extends downwardly toward the vehicle floor and is positioned between the seat cushion 12 and the dashboard 13 of a vehicle. The middle portion 2 is preferably positioned approximately equal distance from the seat cushion 12 and the dashboard 13 of the vehicle.

A safety shield or net 9 is optionally, though preferably, attached to the middle portion 2 and extends between the barrier members 4 and 5 in order to provide an additional barrier means from the inflating airbag. Various types of safety shields may be used, including a single bar, multiple bars or a solid plastic cover, but preferably is a mesh shield as shown in FIG. 1 The safety shield 9 is positioned to be of a height and size sufficient to shield the head of a small child from impact from the inflation of an airbag and acts as a protective head guard for the child passenger as the airbag inflates outwardly from the dashboard 13. The safety shield 9 may be constructed of any resilient material such as metal or plastic similar to support beams 4 and 5. In the case of netting for the shield 9, an impact resistant fiber such as Kevlar® may be used for added safety from flying objects.

The bottom portion 3 preferably includes support legs 12 for resting on the floor of a vehicle. Also, a support brace 8 is preferably included to provide additional support to the support beams 4 and 5, and as the attachment means for a clamping means 11.

As shown in FIGS. 1 and 2, a detachable clamping means 11 preferably engages the lower portion 3 so that the airbag barrier 10 is held firmly in place within the confines of the vehicle. The clamping means 11 preferably comprises at least one "J"-shaped seat clamp 11 which is attached to the support brace 8 and which attaches to the front car seat 15. As best shown in FIG. 2, the seat clamp 11 is preferably connected underneath the car seat 15 to allow for easy attachment and removal of the airbag barrier 10. Preferably two seat clamps 11 are used, although any number of seat clamps 11 may be used to secure the airbag barrier 10 securely in position within the confines of the vehicle. As the present invention is directed to small passengers, it is contemplated that the passenger's feet will rest entirely on the seat cushion or hang over the seat's edge and support brace 8, thereby resting external to the airbag barrier cage 10.

In operation, as the airbag inflates outwardly from the dashboard 13 toward the child or small passenger, the airbag contacts the barrier members 4 and 5 of the middle portion 2 and the safety shield 9 extending therebetween, which prevent the airbag from contacting the passenger while it is still inflating. The connecting portion 6 and the seat clamps 11 act to hold the airbag barrier 10 firmly in place against the force of the inflating airbag. In this manner, the passenger, who, because of his or her age or height, is susceptible to severe injury caused by impact from the inflating airbag due to its angle of trajectory, is shielded from such impact.

It is contemplated that the connecting portion 6 may attach, e.g., with J-clamps or other fastening devices, to the car seat 15 or headrest 14 rather than be supported in front of it. It is also contemplated that the top portion 1 and/or the connecting portion 6 may be adjusted in a lengthwise telescoping fashion by any conventional means, including, but not limited to, screws, fasteners or locks, in order to accommodate the varying vehicle headrest sizes and heights, and the varying inclined positions of the seat.

It is further contemplated that the safety shield 9 may be vertically adjusted along the length of the middle portion 2 by any conventional means including, but not limited to, screws, fasteners or locks, in order to accommodate occupants of differing height so that various sized passengers may be properly shielded from the impact of an inflating airbag.

Finally, it is contemplated that the support legs 12 may be adjusted by any conventional means including, but not limited to, screws, fasteners or locks in order to raise or lower the airbag barrier 10 to a height sufficient to accommodate a variety of internal heights of vehicles.

Figure 3:
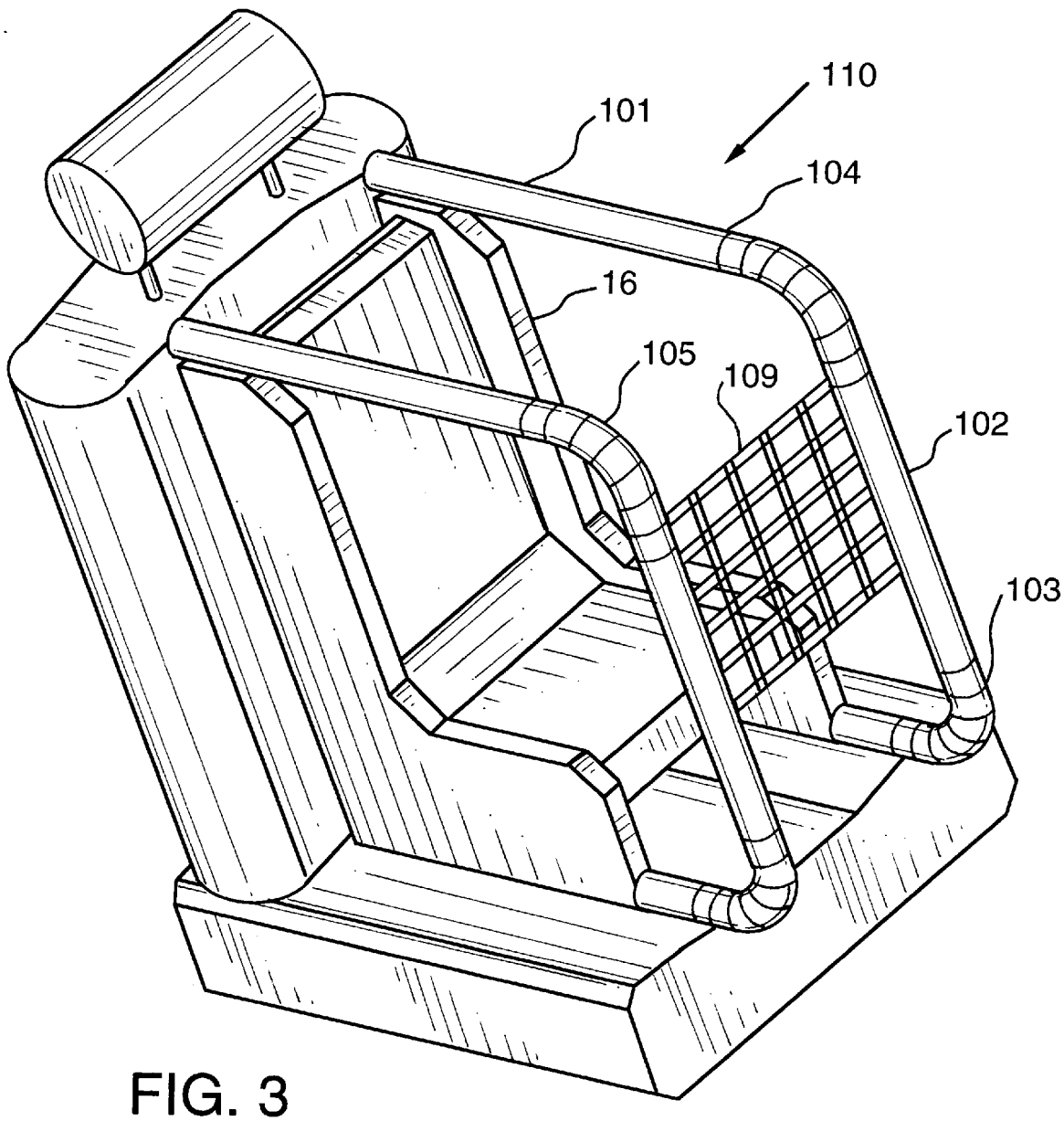
FIG. 3 an isometric view of the airbag barrier cage of the present invention integral with a front facing child car seat.
Figure 4:
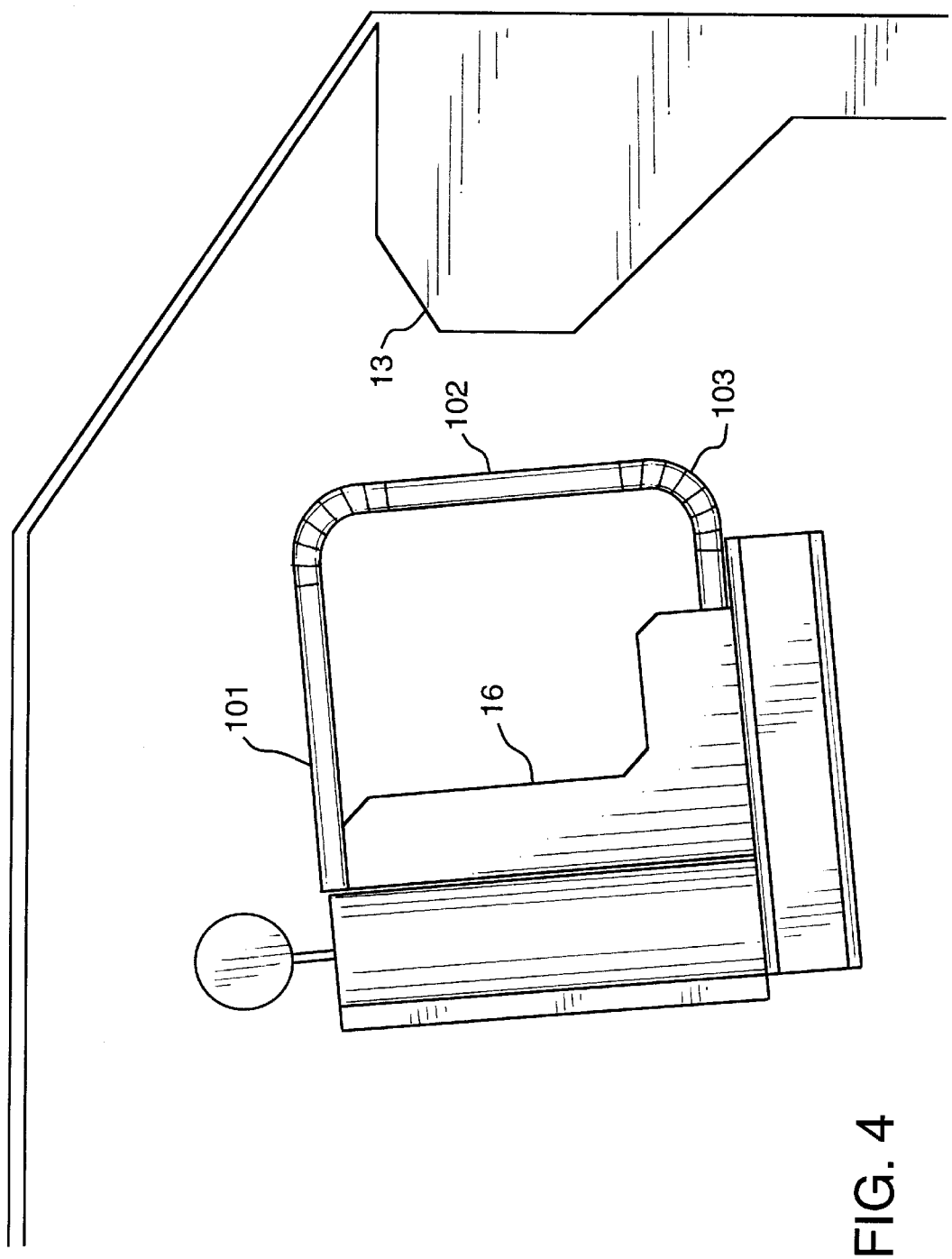
FIG. 4 is a side view of the airbag barrier cage of FIG. 3.

An alternate embodiment of the present invention is illustrated in FIGS. 3 and 4 which show an airbag barrier 110 in combination with a front facing child car seat 16. The child car seat 16 is anchored to the vehicle through use of a conventional seat belt system.

Similar to that discussed previously, the airbag barrier 110 comprises, preferably, two barrier members 104 and 105 which include a top portion 101, a middle barrier portion 102 and a lower connecting portion 103. No particular type of child car seat 16 is necessary, as the present invention may accommodate any conventional child car seat 16. The barrier members 104 and 105 may be constructed of any resilient material including, but not limited to, metal or resilient plastic, including fiber reinforced resins, and are preferably approximately 1 inch in diameter where steel is the construction material of choice. It is also contemplated that a heavy padding material surround the barrier members 104 and 105 for added protection.

The airbag barrier 110 preferably includes two substantially parallel barrier members 104 and 105 positioned outwardly from the child car seat 16. As shown in FIG. 3, although the distance between the barrier members 104 and 105 may vary, the barrier members 104 and 105 are preferably placed on either side of the child car seat 16, and are spaced closely enough together so as not to allow an inflating airbag to significantly penetrate therebetween.

The top portion 101 of the airbag barrier 110 preferably extends horizontally over the head of the child passenger and, attaches to the top of the child car seat 16, while the lower connecting portion 103 connects to the bottom of the child car seat 16. The barrier members 104 and 105 extend from the horizontal top portion 101 and bend downwardly to form the substantially vertical middle portion 102 as best shown in FIG. 4. The substantially vertical middle portion 102 preferably bends inwardly to form a substantially horizontal bottom portion 103 which attaches to the bottom of the child car seat 16.

The barrier members 104 and 105 provide a frontal enclosure to the child car seat 16 such that a child seated in the forward facing car seat 16 is prevented from being struck in the head by an inflating airbag propelled from the dashboard 13 of a vehicle.

Included in the middle portion 102 is a mesh shield 109 extending between the barrier members 104 and 105 and positioned to be of a height sufficient to shield the head of a small child from impact from the inflation of the airbag.

It should be noted that either of the previously-mentioned embodiments may have mesh netting and/or Kevlar® fabric or other projectile-proof material around the entire top and sides of the barrier members 104 and 105 in order to provide greater protection from inflating side airbags or flying objects upon sudden vehicular impact. Additionally, it is contemplated that the mesh shield 109 may be adjusted vertically so that the device may be used for children of various sizes and heights.

Figure 5:
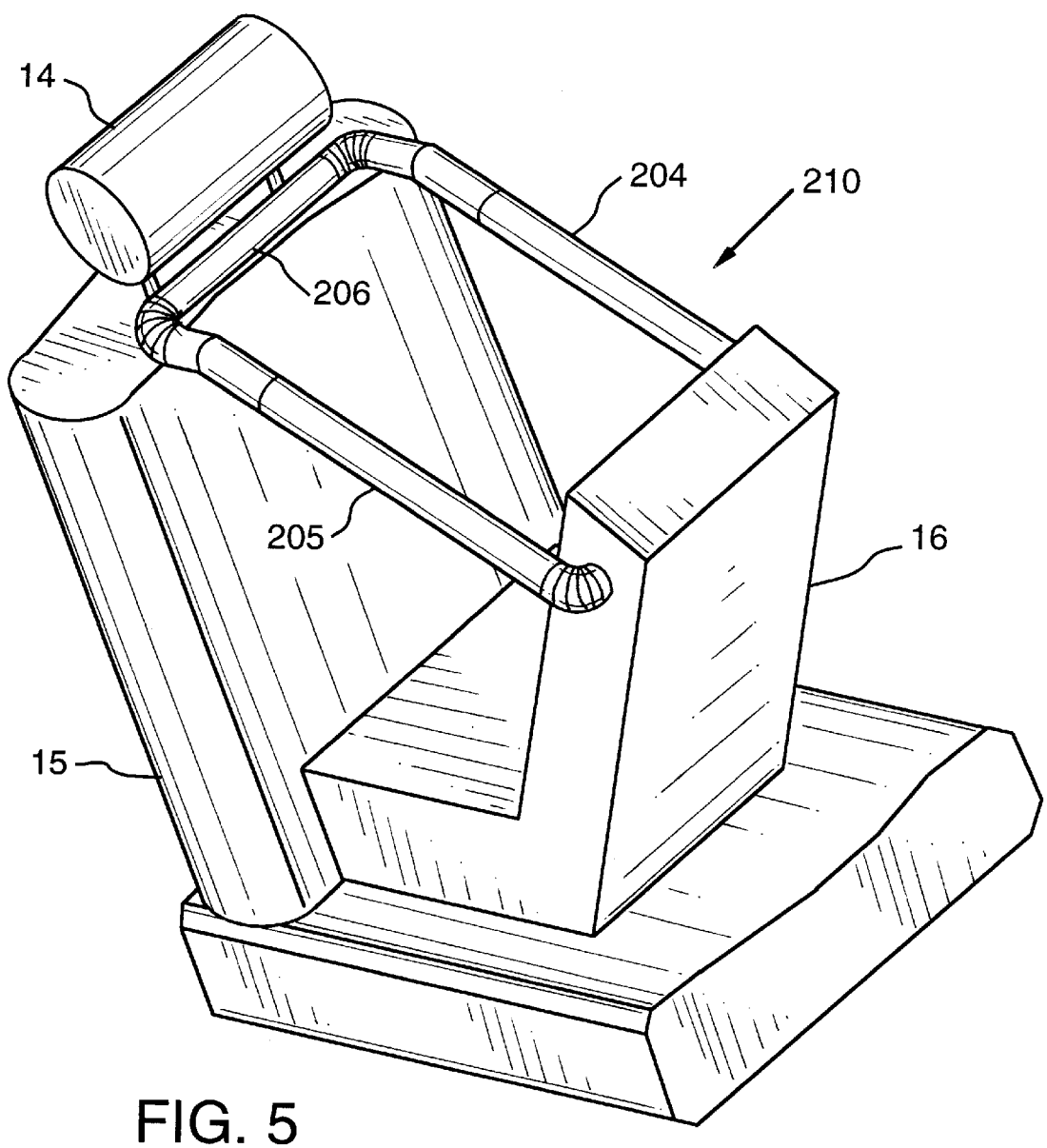
FIG. 5 is an isometric view of a support brace of the present invention integral with a rear facing child car seat.
Figure 6:
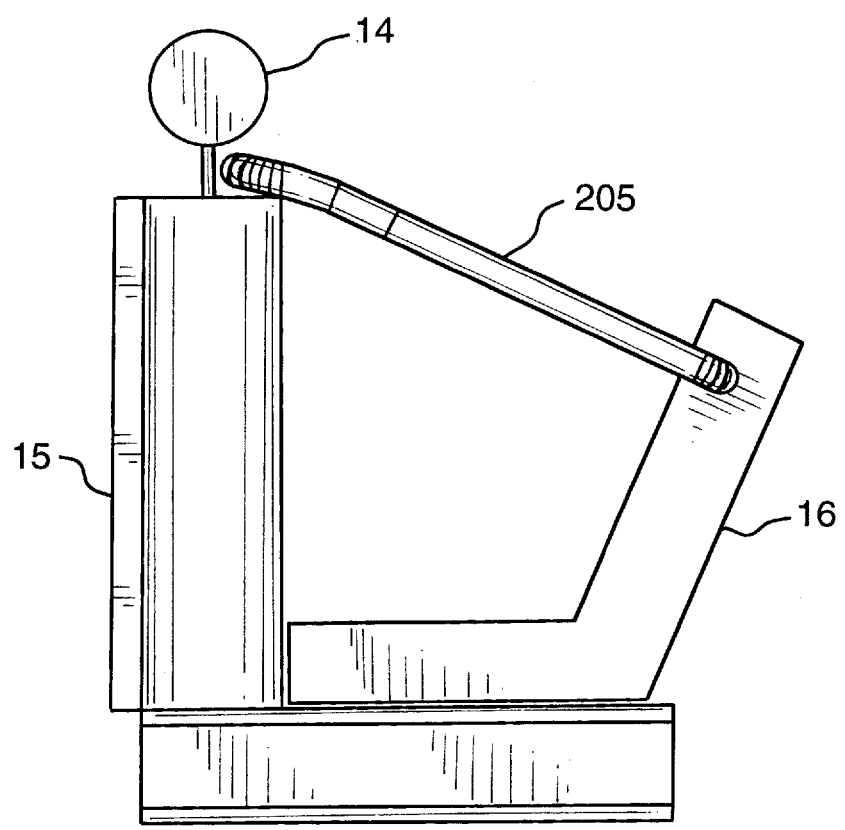
FIG. 6 is a side view of the support brace of FIG. 5.

Another preferred embodiment of the present invention is illustrated in FIGS. 5 and 6, which illustrate a support brace 210 in combination with a rearwardly facing child car seat 16. In this embodiment, the support brace 210 includes two substantially parallel barrier members 204 and 205 and a connecting portion 206 extending between and joining the barrier members 204 and 205. As shown in FIG. 5, the barrier members 204 and 205 preferably attach to, and extend outwardly from, either side of the child car seat 16. The connecting portion 206 engages the vehicular seat 15 and preferably bends inwardly from, and connects the barrier members 204 and 205. The connecting portion 206 is preferably positioned under the headrest 14 of the vehicle seat 15 as best shown in FIG. 6.

During operation, the support brace 210 prohibits the child car seat 16 from being forced against the vehicle seat 15 from any force, including that of an inflating airbag, acting against the back of the child car seat 16, thereby preventing head and neck injury to the small child seated therein.

In addition to that described previously, it is contemplated that the connecting portion 106 may attach e.g., with J-clamps or other fastening devices, to the car seat 15 or the headrest 14 rather than be supported in front of it. It is also contemplated that barrier members 204 and 205 may include telescopic adjustment means so that they may be extended in a lengthwise fashion to the size of any car seat 15 or any inclined position of a car seat 15. It is also contemplated that the barrier members 204 and 205 may be detachably or pivotally mounted, rather than fixedly attached, to the sides of the child car seat for easy adjustment to a particular height of a headrest 14.

Although the invention has been described in detail in the foregoing for the purpose of illustration, it is to be understood that such detail is solely for that purpose and that variations can be made therein by those of ordinary skill in the art without departing from the spirit and the scope of the invention as defined by the following claims, including all equivalents thereof.

I claim:

1. An airbag barrier positioned between a dashboard and a seat of a vehicle for shielding a passenger in the seat, comprising:

a) a first and second barrier bar, each barrier bar having an upwardly extending middle portion, a top portion, and a lower portion, said middle portions having an upper and lower end;

b) each of said top portions connected to said upper end of said respective middle portion for extending over the passenger in the car seat;

c) each of said lower portions connected to said lower end of said respective middle portion and extending downwardly therefrom;

d) a support connected to said top portions of said first and second barrier bars and adapted to engage a headrest of said seat; and e) a clamp, extending horizontally from said lower portions, for detachably connecting said first and second barriers to the seat.

2. The airbag barrier of claim 1 wherein each of said lower portions comprises a leg member with a support brace extending between each adjacent leg member, said clamp connected to said support brace.

3. The airbag barrier of claim 1 wherein said first barrier bar is substantially parallel to said second barrier bar.

4. The airbag barrier of claim 1 further comprising at least one brace member extending between said first and second barrier bar.

5. The airbag barrier of claim 1 wherein said top portions are substantially horizontal and further comprise a connecting portion connecting said first barrier bar to said second barrier bar.

6. The airbag barrier of claim 1 wherein said middle portion is substantially vertical and further comprises a safety shield extending between said first and second barrier bar and positioned at a height sufficient to substantially shield a passenger's head from impact with a deployed airbag.

7. The airbag barrier of claim 6 wherein said safety shield consists of a mesh material.

8. An airbag barrier positioned between a dashboard and a car seat in a vehicle for shielding a passenger in the car seat, comprising:

a) a first and second barrier bar, each barrier bar having an upwardly extending middle portion, a top portion, and a lower portion, said middle portions having an upper and lower end;

b) each of said top portions connected to said upper end of said respective middle portion for extending over the passenger in the car seat;

c) each of said lower portions connected to said lower end of said respective middle portion and extending downwardly therefrom, said lower portions extending substantially horizontally at the ends thereof for engagement with the car seat; and d) a support connected to said top portions of said first and second barrier bars and adapted to engage only the top portion of the car seat.

9. The airbag barrier of claim 8 wherein said first barrier bar is substantially parallel to said second barrier bar.

10. The airbag barrier of claim 8 wherein said top portions are substantially horizontal and further comprises a connecting portion connecting said first barrier bar to said second barrier bar.

11. The airbag barrier of claim 8 further comprising at least one brace member extending between said first and second barrier bars.

12. The airbag barrier of claim 8 wherein said middle portion is substantially vertical and further comprises a safety shield extending between said first and second barrier bar and positioned at a height sufficient to substantially shield the passenger's head from impact with a deployed airbag.

13. The airbag barrier of claim 12 wherein said safety shield consists of a mesh material.

* * * * *